JAMES McCABE.
Improvement in Car Brakes.
No. 123,033.
Patented Jan. 23, 1872.
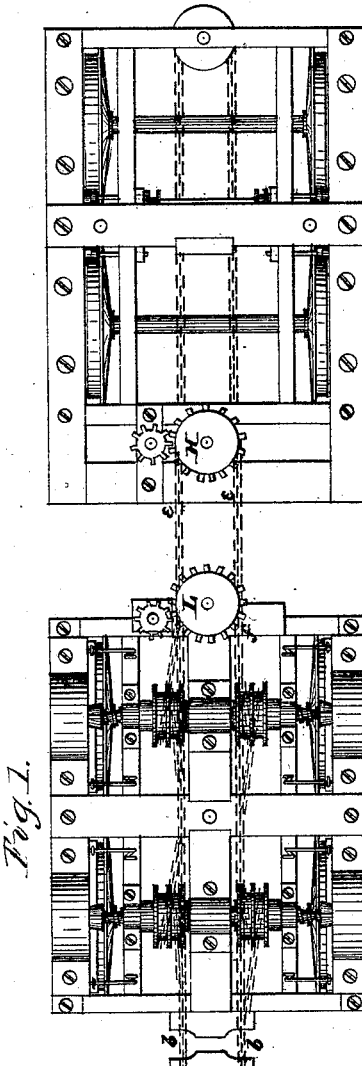
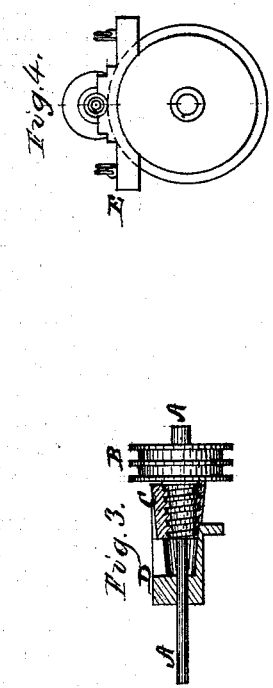
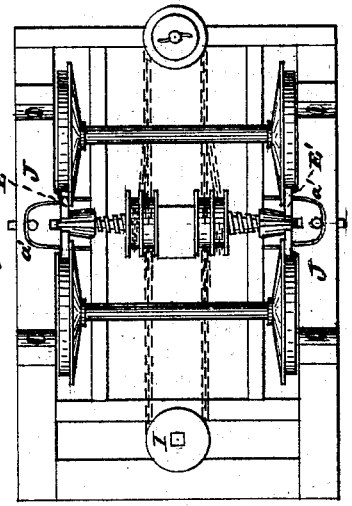
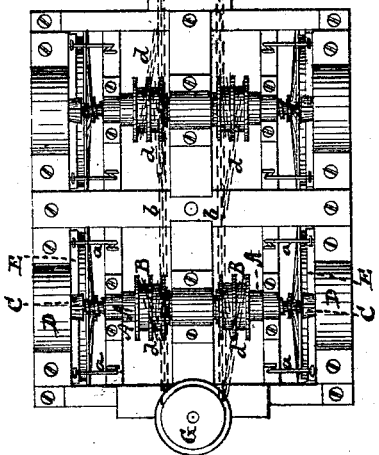
Witnesses
Inventor
James McCabe
Per,
T. H. Alexander
Atty.

UNITED STATES PATENT OFFICE.

JAMES McCABE, OF RONDOUT, NEW YORK.

IMPROVEMENT IN CAR-BRAKES.

Specification forming part of Letters Patent No. 123,033, dated January 23, 1872.

*To all whom it may concern:*

Be it known that I, JAMES MCCABE, of Rondout, in the county of Ulster and State of New York, have invented certain new and useful Improvements in Railroad Car-Brakes; and I do hereby declare that the following is a full, clear, and exact description thereof, reference being had to the accompanying drawing and to the letters of reference marked thereon which form a part of this specification.

The nature of my invention consists in the construction and arrangement of a car-brake and in the mode of applying the same by means of combined screw and wedge power, as will be hereinafter more fully set forth.

In order to enable others skilled in the art to which my invention appertains to make and use the same, I will now proceed to describe its construction and operation, referring to the annexed drawing, in which—

Figure 1 represents a plan view of the trucks of a passenger-car and locomotive-tender with my brake attached. Fig. 2 is a bottom view of the tender-truck. Fig. 3 is an enlarged section, showing the wedge and screw used to apply the brake; and Fig. 4 is a side view of the wheel and brake-shoe.

A represents a screw-shaft placed over and parallel with the axle of the car, one end resting in a bearing at the middle of the truck; and toward this end is a tight pulley-wheel, B. A second bearing is bolted to one of the truck-beams and supports the shaft in the center. On the other end of this shaft is a thread fitting into a screw-nut, C, having the shape of a truncated cone, and which, from its shape and effect, I term an elliptic wedge. This wedge, having a feather on the upper side, fits into a block, D, of iron, with a slot in it, and bolted on the beam of the truck over the axle. The side of this block next the wheel extends downward to keep the brake in its place on the topmost part of the wheel. It projects over the brake and bears against the wedge, and also serves as a third bearing for the screw-shaft. The sliding place of the cone or wedge C on the top or back of the brake E has the shape of an inclined plane transversely to permit some point of the wedge to rest thereon at all times. The screw-threads are coarse and wide to insure strength and rapidity of movement. The tight pulley B works the shaft A, and the screw of said shaft, working in the wedge C, will either advance or withdraw it. The brake E is suspended by light springs *a a* fixed to the beam, and as the wedge advances its increasing rotundity will put the brake on the wheel, and, reversing the pulley, the wedge withdraws, allowing the springs to lift the brake off. Machinery similar to the above is provided for each brake. On each car are two iron rods, *b b*, (represented in the drawing by chains,) passing over the tight pulleys B B on each side, and connected by a chain passing around a loose pulley, G, on the rear end of the last car in the train, and situated on the truck or suspended from the bunker, if more suitable. These iron rods I call leaders. Each tight pulley B has two circumferential grooves, around each of which passes a short chain, *d*, but in opposite directions, so that as one winds the other unwinds. One end of each chain *d* is attached to the pulley, while the other end is connected with the leader *b*. Short chains should be attached to the ends of the leaders to connect with their counterparts on the next car, both in front and rear.

In the drawing I have represented the leaders *b b* as connected with a chain, *e*, placed around a drum, H, on the tender. The drum-chain *e* is made fast by a screw-bolt; but for practical purposes it is advisable to let the chain have one full turn around the drum besides being secured to it. The working of the drum winds one side while it unwinds the other. It applies and raises all the brakes simultaneously. The drum H is operated by a hand-wheel with shaft and gearing, and the axle of the drum is continued downward, having on its lower part a smaller drum, I, designed to work the brakes on the tender only.

The machinery on the tender is identical with that on the car, but has not a similar position. The screw-shafts are on a level with the truck-axles. The brake is on the side of the wheel. One wedge enters between two brakes, and applies them to the wheels, and can be withdrawn in the same manner as above described. A binder, J, having a slot, is bolted to the axle-boxes and keeps the brakes in their respective places. The brake E' is suspended from a pin at one end and kept from the wheel by one end of a double spring, $a'$, bolted to the binder.

Freight-cars and others having the wheels on the same side in such close proximity can be operated on the tender plan, and will require on each only about one-half of the machinery used for operating a passenger-car. On each end of the car should be a hand-wheel with shaft and gearing, and on the loose pulley or drum L, worked by it, is made fast a chain, $f$, the ends of which are to be attached to the leaders $b\ b$. By this means a single car, when drawn by horses, can have its brakes operated by the same machinery. The gearing for each drum L should be movable, so that when not in use it may rest below the drum and be out of the way. The ends of the chain $f$ may be hooked to the platform so as to secure them from accident. In a full-sized car each of the leaders $b$ is to consist of three parts, one over each truck and one for the long space between the trucks, all having ring connections and supported on the requisite number of sheaves to be suspended from the bottom of the platform or otherwise. These sheaves should have their fastenings so constructed that they could make half a turn or more horizontally.

The leaders $b\ b$ could be placed underneath the tight pulleys B B in the same way as above, and the drums brought on a level with them. This plan would give more liberty to the machinery, permit of the tight pulley being made of greater diameter, and, therefore, give a greater leverage and power for working the screw-shaft.

The machinery may be constructed in a manner so as to apply the brakes with one turn, more or less, of the hand-wheel on the tender.

The brakeman should have an elevated position, standing on a level with the top of the tender-box, with a cab or something similar to a pilot-house for protection, from whence he could, with advantage, see danger ahead of any other on the train.

The wedge or cone C could have almost the the shape of the mechanical wedge, the top side being level and the under side taper.

The advantages of my invention may be briefly set forth as follows: The mode of operating the brakes is instantaneous if necessary, or, as they are worked by a screw movement, they can be applied leisurely; and are, therefore, applicable on ordinary occasions, as well as in case of emergency. They can also be raised with equal ease and celerity. The mode is powerful and effective, arising from the combination of the screw and wedge. The brakes of several cars can be operated by one person standing on the tender, and if the train is too long for this person to operate he can be aided by another toward the center by means of the hand-wheel on the car after the drum-chains are connected with the leaders. By this same machinery a car, when drawn by horses, can have the brakes applied conveniently and without loss of time. The machinery is simple, easily adjusted to present cars, does not cost much, and is worked by a common manual performance, requiring no extraordinary or dangerous agency to aid in the operation. If applied to railroads it will be a safeguard to the rolling-stock by preventing collisions. It will reduce the expenses of railroad corporations, and, consequently, should reduce the fares, and will be a protection to the lives of the traveling public.

Having thus fully described my invention, what I claim as new, and desire to secure by Letters Patent, is—

1. The conical or elliptical wedge C moved out and in by the screw-shaft A, for the purpose of operating one or two brakes, substantially as herein set forth.

2. The combination of the tight pulleys B B, chains $d\ d$, and leaders $b\ b$, connected with a drum on the same or other car, or with a drum on the tender, substantially as and for the purposes herein set forth.

In testimony that I claim the foregoing as my own I affix my signature in presence of two witnesses.

JAMES McCABE.

Witnesses:
  J. DILLON,
  JAS. McHUGH.